United States Patent [19]

Akaike et al.

[11] Patent Number: 5,558,244
[45] Date of Patent: Sep. 24, 1996

[54] OIL RESERVOIR HAVING A CAP WITH CYLINDRICAL BAFFLES DEFINING LABYRINTH PASSAGE

[75] Inventors: Seiji Akaike; Shinichi Komatsu, both of Atsugi, Japan

[73] Assignee: Unisia Jecs Corporation, Atsugi, Japan

[21] Appl. No.: 383,584

[22] Filed: Feb. 3, 1995

[30] Foreign Application Priority Data

Feb. 24, 1994 [JP] Japan ................................. 6-049974

[51] Int. Cl.[6] .................................................. B65D 51/16
[52] U.S. Cl. ...................... 220/374; 220/86.2; 220/367.1; 220/DIG. 32; 220/DIG. 33; 277/57
[58] Field of Search ...................................... 220/374, 366, 220/373, 86.2, DIG. 32, DIG. 33, 86.1, 366.1, 367.1, 374; 277/57

[56] References Cited

U.S. PATENT DOCUMENTS

| | | | |
|---|---|---|---|
| 3,144,280 | 8/1964 | Sorenson | 277/57 X |
| 4,460,101 | 7/1984 | Tseng | 220/374 X |
| 4,693,393 | 9/1987 | DeMinco et al. | 220/374 |
| 5,232,115 | 8/1993 | Bauer | 220/373 X |
| 5,435,454 | 7/1995 | Ishii | 220/374 |

FOREIGN PATENT DOCUMENTS 61-19101  2/1986  Japan .

*Primary Examiner*—Allan N. Shoap
*Assistant Examiner*—Robin A. Hylton
*Attorney, Agent, or Firm*—Foley & Lardner

[57] ABSTRACT

A reservoir for automotive vehicles comprises first baffles concentrically arranged inside a cap and having different diameters, and second baffles concentrically arranged inside a filler port of the reservoir and having different diameters, the second baffles being concentric with the first baffles. The first and second baffles are disposed alternately. The second baffles are formed with a communication port for allowing fluid communication in the reservoir.

7 Claims, 2 Drawing Sheets

OIL RESERVOIR HAVING A CAP WITH CYLINDRICAL BAFFLES DEFINING LABYRINTH PASSAGE

BACKGROUND OF THE INVENTION

The present invention relates generally to an oil reservoir cap and more particularly, to an oil reservoir cap with a plurality of cylindrical baffles.

Generally, oil reservoirs such as a working fluid reservoir mounted on automotive vehicles and the like are provided with a filler port which is closed by a detachable cap.

As to the oil reservoir cap, a cap having a baffle plate and a breather is proposed so as to prevent a leakage of oil out of the filler port due to splashing thereof within the oil reservoir by vibrations during cruising of the automotive vehicle, and a rise in pressure within the oil reservoir. This cap comprises four component parts: a body cap, a cover cap, a packing for preventing an oil leakage, and a spring plate for tightening the cap. Additionally, an oil reservoir as disclosed in JP-U 61-19101 is proposed so as to prevent an oil leakage out of the filler port and a rise in pressure within the oil reservoir.

With the above cap structure, however, due to simple construction of the baffle plate and the breather, an oil leakage out of the filler port and a rise in pressure within the tank cannot be prevented surely. Further, due to the large number of the components parts (i.e., the cap comprises four component parts as described above), the cap has a complicated construction, and needs a large number of manufacturing and assembling processes, increasing the cost. Furthermore, since the cover cap should be press-fitted after assembling the spring plate to the body cap, and setting the packing, the cap is not excellent in assembling performance.

Additionally, the oil reservoir as disclosed in JP-U 61-19101 has inconveniences such as the large number of manufacturing processes and a bad cost performance due to complicated construction.

It is, therefore, an object of the present invention to provide an oil reservoir cap which enables, with easy manufacturing and assembling, a sure prevention of an oil leakage and a rise in pressure within the oil reservoir.

SUMMARY OF THE INVENTION

There is provided, according to the present invention, a reservoir for an automotive vehicle, the reservoir having a filler port, comprising:

a cap detachably mounted to the filler port of the reservoir;

a plurality of first baffles concentrically arranged inside said cap, said plurality of first baffles having different diameters;

a plurality of second baffles concentrically arranged inside the filler port of the reservoir and having different diameters, said plurality of second baffles being concentric with said plurality of first baffles, said plurality of first baffles and said plurality of second baffles being disposed alternately; and means, arranged to said plurality of second baffles, for allowing fluid communication in the reservoir.

DETAILED DESCRIPTION OF THE INVENTION

Figure 1:
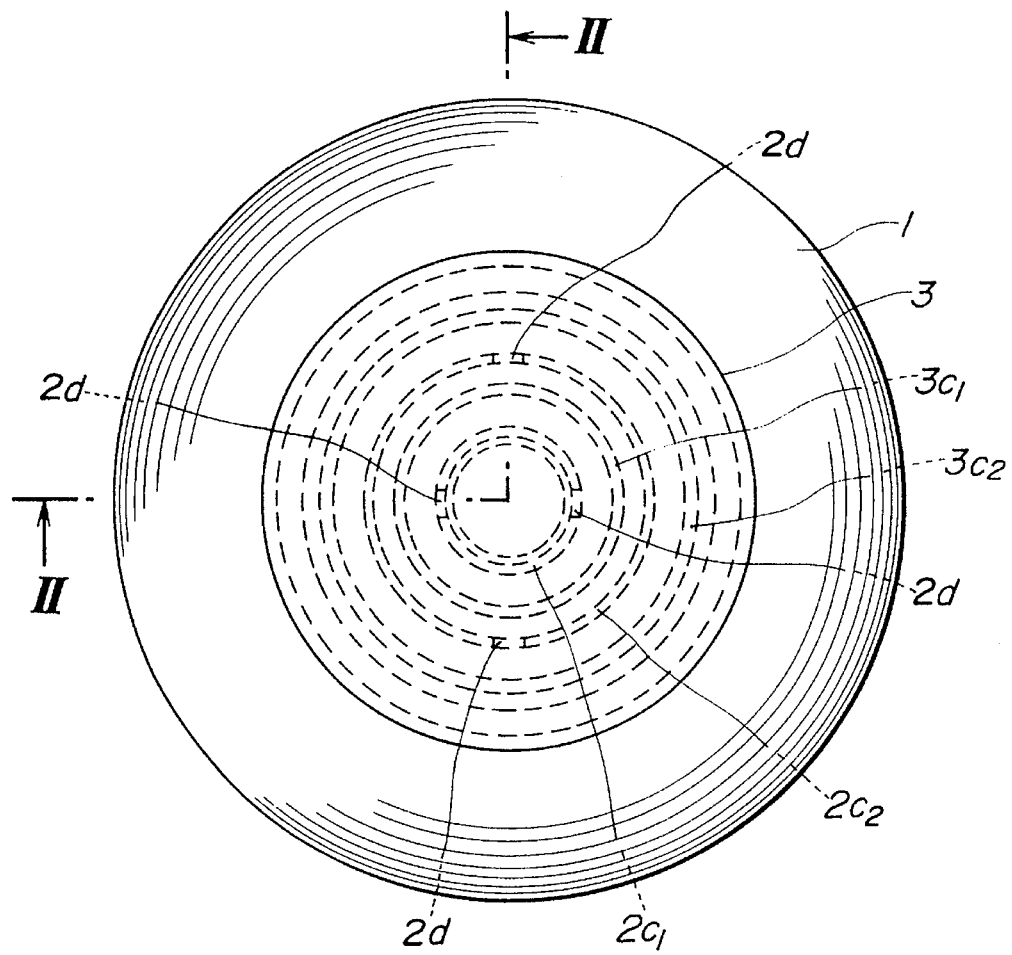
FIG. 1 is a plan view showing a preferred embodiment of an oil reservoir cap according to the present invention.
Figure 2:
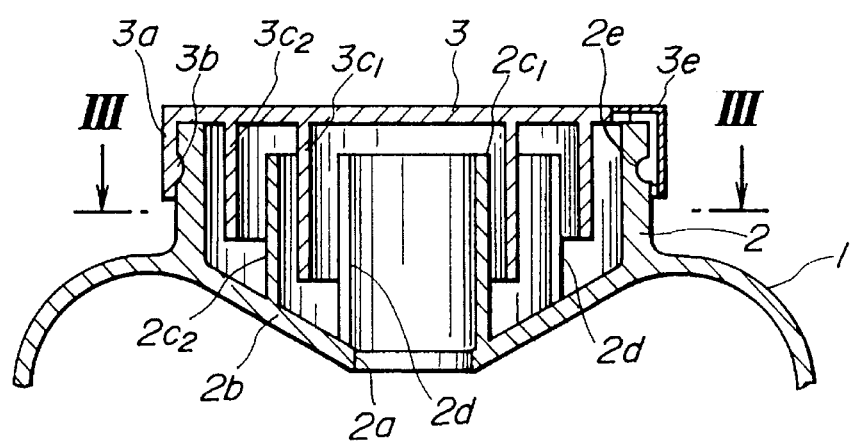
FIG. 2 is a vertical section taken along the line II—II in FIG. 1.
Figure 3:
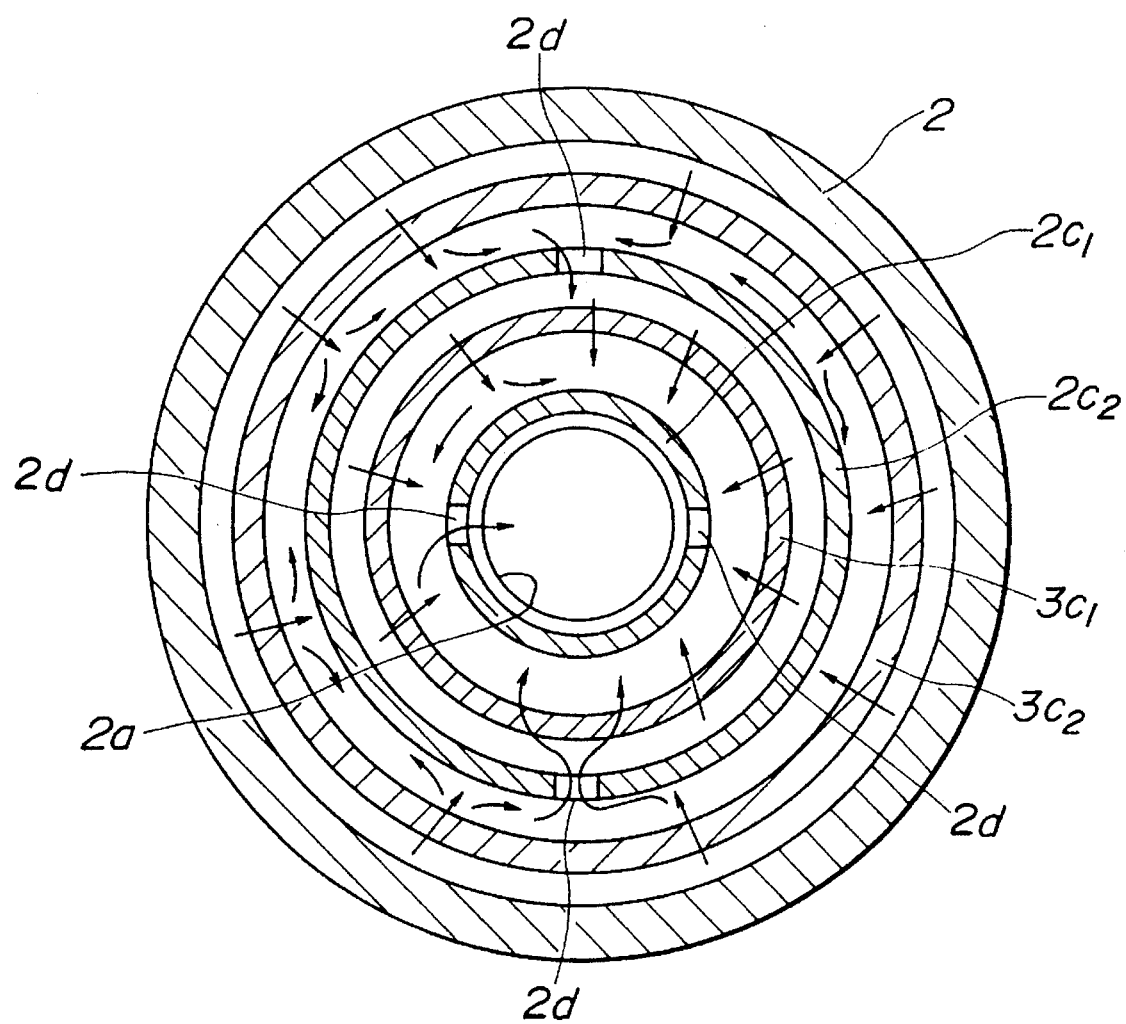
FIG. 3 is a horizontal section taken along the line III—III in FIG. 2.

Referring to FIGS. 1 to 3, there is shown a preferred embodiment of the present invention wherein a reservoir, generally designated by reference numeral 1, has a filler port 2, and a cap main body 3 for closing the filler port 2.

A funnel-like baffle $2b$ having an opening $2a$ in the center thereof is formed inside the filler port 2.

Referring particularly to FIG. 2, the cap main body 3 is made of synthetic resin, and has a cylindrical portion $3a$ with an inner peripheral surface on which a protrusion $3b$ is protrusively arranged to engage with an engagement groove $2e$ formed on an outer peripheral surface of the filler port 2, through the protrusion $3b$ the cap main body 3 being secured to an opening of the filler port 2 in the tightened state. Cylindrical baffles $3e$ are protrusively arranged on the underside of the cap main body 3. First cylindrical baffles $3c_1$, $3c_2$ are protrusively arranged on the underside of the cap main body 3. The first cylindrical baffles $3c_1$, $3c_2$, which have different diameters, are arranged concentrically and protrusively. The smaller diameter cylindrical baffle $3c_1$ is axially longer than the larger diameter cylindrical baffle $3c_2$.

Protrusively arranged inside tile filler port 2 of the reservoir 1 are second cylindrical baffles $2c_1$, $2c_2$ having different diameters and concentric with the first cylindrical baffles $3c_1$, $3c_2$. The second cylindrical baffle $2c_1$, which has smaller diameter than the longer first cylindrical baffle $3c_1$, is located in the longer cylindrical baffle $3c_1$, whereas the other second cylindrical baffle $2c_2$ is located between the first cylindrical baffles $3c_1$, $3c_2$. A clearance is found between an end of each second cylindrical baffle $2c_1$, $2c_2$ and the underside of the cap main body 3. Referring particularly to FIGS. 1 and 3, the second cylindrical baffles $2c_1$, $2c_2$ are formed with two slits $2d$ which constitute a communication part, respectively. The slits $2d$ are offset with each other at 180° with respect to each second cylindrical baffle $2c_1$, $2c_2$, and at 90° between the second cylindrical baffles $2c_1$ $2c_2$.

Referring to FIG. 2, a breather hole $3e$ is formed on the upper side of the cap main body 3 so as to allow communication of the inside of the reservoir 1 with the atmosphere.

Next, an operation of this embodiment will be described. Even if due to vibrations of the reservoir 1 during cruising of the automotive vehicle, oil received therein is splashed up to reach the side of the cap main body 3 through the opening $2a$ of the baffle $2b$, oil is obstructed by the first cylindrical baffles $3c_1$, $3c_2$ and the second cylindrical baffles $2c_1$, $2c_2$ having the multiple structure and protrusively arranged to the cap main body 3 and the baffle $2b$, respectively. Thus, these baffles effectively prevent oil from spattering onto the periphery and underside of the cap main body 3, preventing leaks out of the filler port 2, resulting in a high sealing performance. That is, passing though the clearance between the pointed end of each second cylindrical baffle $2c_1$, $2c_2$ and the underside of the cap main body 3, or the clearance between the end of each first cylindrical baffle $3c_1$, $3c_2$ and the baffle $2b$, or the slits $2d$ of the second cylindrical baffles $2c_1$, $2c_2$, oil splashed up enters a space of the cap main body 3 between the first cylindrical baffles $3c_1$, $3c_2$ and the second cylindrical baffles $2c_1$, $2c_2$, and undergoes a gradual attenuation. Then, as indicated by arrows in FIG. 3, passing through the slits $2d$ of the second cylindrical baffles $2c_1$, $2c_2$, this oil drops in the reservoir 1 through the opening $2a$ due to an inclination of the baffle $2b$, resulting in no oil accumulation in the cap main body 3.

Moreover, since the one second cylindrical baffle $2c_1$, which has smaller diameter than the one first cylindrical baffle $3c_1$, is located in the one cylindrical baffle $3c_1$, and integrated with the baffle $2b$, and the one first cylindrical baffle $3c_1$ is longer, these cylindrical baffles $3c_1$, $2c_1$ function effectively as an interruption wall for surely preventing oil splashed out of the reservoir 1 from spattering onto the periphery of the cap main body 3.

On the other hand, even with a change in pressure in the reservoir 1 due to temperature variations, etc., air within the reservoir 1 is released or atmosphere is introduced therein through the breather hole $3e$ of the cap main body 3, resulting in a prevention of pressure variations in the reservoir 1.

Moreover, in this embodiment, the first cylindrical baffles $3c_1$, $3c_2$ and second cylindrical baffles $2c_1$, $2c_2$ are disposed concentrically and alternately to form a labyrinth structure. As a result, it is not necessary to put the ends of the first cylindrical baffles $3c_1$, $3c_2$ into contact with the funnel-like baffle $2b$, or the second cylindrical baffles $2c_1$, $2c_2$ into contact with the underside of the cap main body 3, for example, so as to obtain a sealing performance.

Thus, a high sealing performance is ensured without carrying out strict control of the dimension between the end of each first cylindrical baffle $3c_1$, $3c_2$ and the funnel-like baffle $2b$, or between the end of each second cylindrical baffle $2c_1$, $2c_2$ and the underside of the cap main body 3.

Moreover, in case that the end of each first cylindrical baffle $3c_1$, $3c_2$ is put into contact with the funnel-like baffle $2b$, pressure variations in the reservoir 1 can be prevented by forming communication holes through the first cylindrical baffles $3c_1$, $3c_2$, which holes allow communication of the inside of the reservoir 1 with the atmosphere.

Having described the present invention in connection with the preferred embodiment, it is to be noted that the present invention is not limited thereto, and various changes and modifications are possible without departing from the spirit of the present invention. By way of example, in this embodiment, the first and second cylindrical baffles are two in number, respectively, however, they may be three or more in number.

What is claimed is:

1. A reservoir for an automotive vehicle, the reservoir having a filler port, comprising:

a cap detachably mounted to the filler port of the reservoir;

a plurality of first baffles concentrically arranged inside said cap, said plurality of first baffles extending substantially in an axial direction of the filler port, said plurality of first baffles having different diameters;

a plurality of second baffles concentrically arranged inside the filler port of the reservoir and having different diameters, said plurality of second baffles being concentric with said plurality of first baffles, wherein said plurality of second baffles are unitarily formed in one piece with said filler port, said plurality of first baffles and said plurality of second baffles being disposed alternately; and at least one communication port formed through each of said second baffles, for allowing fluid communication with the reservoir.

2. A reservoir as claimed in claim 1, wherein said plurality of first baffles and said plurality of second baffles are in the form of a cylinder.

3. A reservoir as claimed in claim 1, wherein each of said communication ports is a slit.

4. A reservoir as claimed in claim 3, wherein the communication ports of said second baffles are offset at a predetermined angle with respect to each other.

5. A reservoir as claimed in claim 1, wherein when said cap is mounted to the filler port of the reservoir, a predetermined clearance is found between an end of each of said plurality of second baffles and underside of said cap.

6. A reservoir as claimed in claim 1, wherein the filler port has a bottom wall with an opening communicating with the reservoir.

7. A reservoir as claimed in claim 6, wherein when said cap is mounted to the filler port of the reservoir, a predetermined clearance exists between an end of each of said plurality of first baffles and the bottom wall of the filler port.

* * * * *